United States Patent
Chasse et al.

(10) Patent No.: US 10,862,845 B2
(45) Date of Patent: *Dec. 8, 2020

(54) MAIL BOT AND MAILING LIST DETECTION

(71) Applicant: HCL Technologies Limited, New Delhi (IN)

(72) Inventors: Brenton P. Chasse, Plainville, CT (US); Andrew E. Davis, Arlington, MA (US); Cory W. Gorman, Clinton, MA (US); Zachary A. Stair, Westborough, MA (US)

(73) Assignee: HCL Technologies Limited, New Delhi (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,411

(22) Filed: Apr. 8, 2019

(65) Prior Publication Data

US 2019/0222548 A1 Jul. 18, 2019

Related U.S. Application Data

(63) Continuation of application No. 15/625,065, filed on Jun. 16, 2017, now Pat. No. 10,305,840.

(51) Int. Cl.
*H04L 12/58* (2006.01)
*G06F 16/335* (2019.01)

(52) U.S. Cl.
CPC ............ *H04L 51/22* (2013.01); *G06F 16/335* (2019.01); *H04L 51/02* (2013.01); *H04L 51/12* (2013.01)

(58) Field of Classification Search
CPC ...... G06Q 10/107; G06N 3/02; G06N 3/0454; G06F 16/335; H04L 51/02; H04L 51/12; H04L 51/22
See application file for complete search history.

(56) References Cited

U.S. PATENT DOCUMENTS

| | | |
|---|---|---|
| 7,293,063 B1 | 11/2007 | Sobel |
| 7,698,370 B1 | 4/2010 | Hall |
| 8,606,866 B2 | 12/2013 | Rybalko |
| 8,856,360 B2 | 10/2014 | Achan et al. |
| 8,924,484 B2 | 12/2014 | Wilson |
| 9,361,605 B2 | 6/2016 | Yablokov et al. |
| 10,050,923 B1 | 8/2018 | Chasse et al. |

(Continued)

FOREIGN PATENT DOCUMENTS

WO 2013189725 A1 12/2013

OTHER PUBLICATIONS

IBM: List of IBM Patents or Patent Applications Treated as Related (Appendix P), May 9, 2019, 2 pages.

(Continued)

*Primary Examiner* — Ranodhi Serrao
(74) *Attorney, Agent, or Firm* — Brooks Kushman P.C.

(57) ABSTRACT

An embodiment of the invention may include a method, computer program product, and system for detecting email messages sent from an automated mailing system. The embodiment may include analyzing email metadata of a user to detect an indication of automation. The embodiment may include identifying any email messages sent corresponding to the pattern of automation. The embodiment may include performing an action in response to the identified email messages.

4 Claims, 5 Drawing Sheets

(56) References Cited

U.S. PATENT DOCUMENTS

| | | | |
|---|---|---|---|
| 2005/0108344 A1* | 5/2005 | Tafoya | G06Q 10/107 709/206 |
| 2006/0271631 A1* | 11/2006 | Qureshi | H04L 51/12 709/206 |
| 2008/0065736 A1* | 3/2008 | Gross | G06Q 10/107 709/207 |
| 2009/0265786 A1 | 10/2009 | Xie et al. | |
| 2010/0082749 A1 | 4/2010 | Wei et al. | |
| 2010/0161537 A1 | 6/2010 | Liu et al. | |
| 2011/0078587 A1* | 3/2011 | Guy | G06Q 10/107 715/752 |
| 2011/0173142 A1 | 7/2011 | Dasgupta et al. | |
| 2013/0247192 A1 | 9/2013 | Krasser et al. | |
| 2013/0268470 A1 | 10/2013 | Yablokov et al. | |
| 2016/0127290 A1 | 5/2016 | Sun et al. | |
| 2018/0367488 A1 | 12/2018 | Chasse et al. | |

OTHER PUBLICATIONS

Pending U.S. Appl. No. 16/377,417, filed Apr. 8, 2019, entitled: "Mail Bot and Mailing List Detection", 25 pages.

Pending U.S. Appl. No. 16/406,445, filed May 8, 2019, entitled: "Mail Bot and Mailing List Detection", 26 pages.

Sanchez, et al. "Blocking Spam by Separating End-User Machines from Legitimate Mail Server Machines", CEAS 2011, Copyright 2011, 9 Pages, ACM, Perth, Australia.

SaneBox, "SaneBox for Business", https://www.sanebox.com/business, 5 pages, Copyright 2017, Printed on Jun. 1, 2017.

Mell, et al., "The NIST Definition of Cloud Computing", NIST, Sep. 2011, 7 Pages, Special Publication 800-145, U.S. Department of Commerce, Gaithersburg, MD.

\* cited by examiner

MAIL BOT AND MAILING LIST DETECTION

BACKGROUND

The present invention relates to a system for managing electronic mail ("email") received by a user, and more specifically, to identifying messages received from mail-bots and messages received as a result from being on a mailing lists.

Email is a means for exchanging, across computer networks (e.g. the Internet), digital messages between users of digital devices, such as computers and mobile phones. Today's email systems are based on a store-and-forward model. Email servers accept, forward, deliver, and store messages. An email client is a computer program used to access and manage a user's email through the use of a mail transfer agent ("MTA") program which may be hosted on the email server. Email can be stored on the client side, the server side, or in both places.

BRIEF SUMMARY

An embodiment of the invention may include a method, computer program product, and system for detecting email messages sent from an automated mailing system. The embodiment may include analyzing email metadata of a user to detect an indication of automation. The embodiment may include identifying any email messages sent corresponding to the pattern of automation. The embodiment may include performing an action in response to the identified email messages.

DETAILED DESCRIPTION

The presence of automated mailing systems, such as mail-bots and mailing lists, is becoming more commonplace. A mail-bot is a software program in an email server that is typically used to automatically send out pre-defined email. Mail-bots may be used to facilitate the practice of sending unwanted email messages, frequently with commercial content, in large quantities to an indiscriminate set of recipients (i.e. email spamming). This practice has grown considerably since the mid-1990s and today accounts for a majority of emails sent worldwide. Additionally, corporate entities may utilize mail bots within their email systems for certain internal communications. A mailing list utilizes email for widespread distribution of information to users whose email is on the mailing list. As with mail-bots, mailing lists can be used for spamming purposes and for legitimate business purposes. Whether the use of automated mailing systems is for malicious purposes or for official purposes, a user may wish to identify messages originating from a mail-bot or mailing list in an attempt to manage incoming email messages and to determine how messages are displayed.

Embodiments of the present invention disclose a bot/mailing list detection system 100, described below, which provides a method for detecting and managing email messages originating from mail-bots and mailing lists, by analyzing a single user's email metadata to detect usage patterns of email senders. Bot/mailing list detection system 100 determines that a sender who sends a predetermined number of email messages within a predetermined period of time, while not having any email messages sent to them, is a mail-bot. Furthermore, bot/mailing list detection system 100 determines that for each email message a user receives that was not explicitly addressed to that user, any other users in the addressee fields must either have sent an email message to someone or be considered a potential mailing list. In embodiments of the present invention, these determinations are based on a single user's email metadata rather than aggregate email metadata belonging to other users. In confining analysis to a single user's email metadata, bot/mailing list detection system 100 avoids possible security and network concerns associated with requiring access to email data belonging to other users. Once mail-bots and mailing lists have been determined, bot/mailing list detection system 100 may identify email messages sent from a mail-bot or resulting from a mailing list and allow the user to determine how those email messages are handled and change how data relating to those identified email messages is displayed.

Embodiments of the present invention will now be described in detail with reference to the accompanying Figures.

Figure 1:
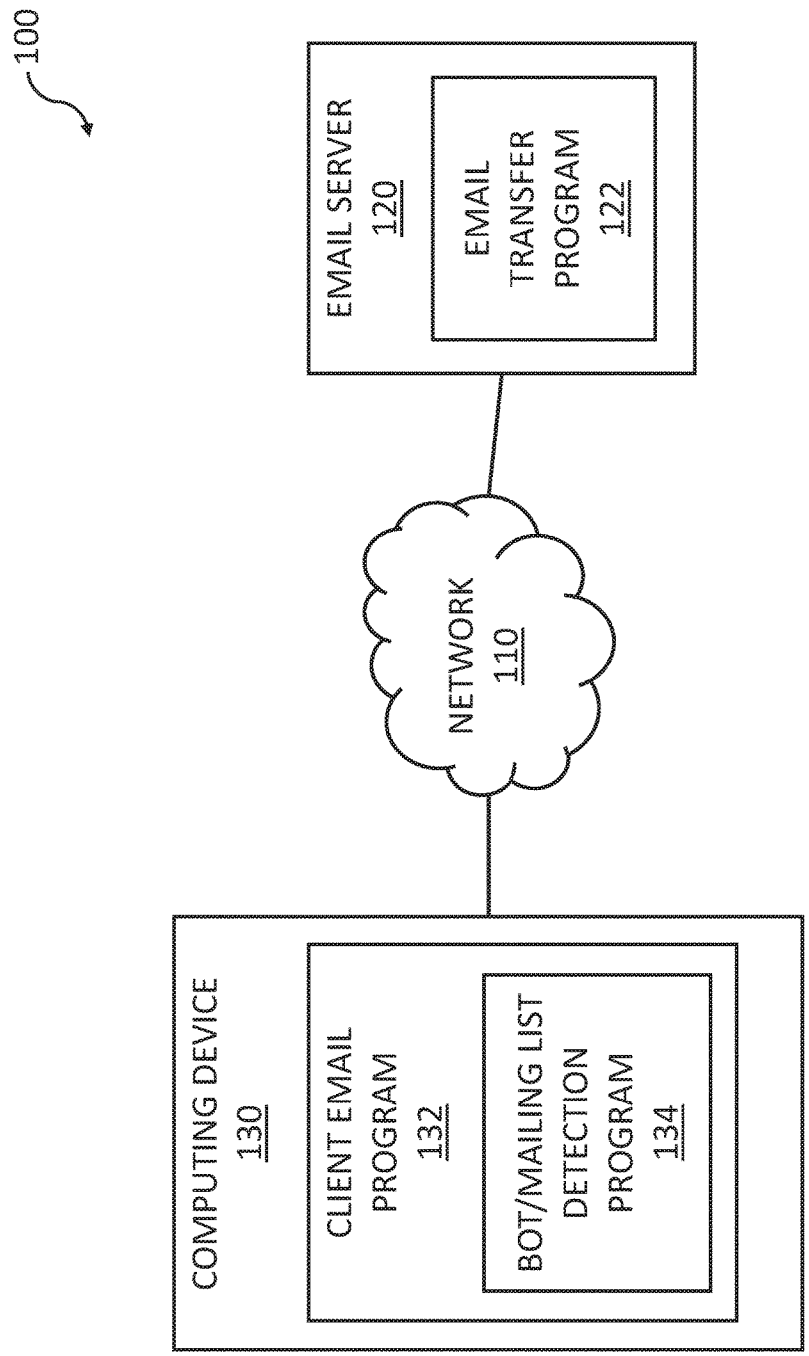
FIG. 1 is a block diagram illustrating a bot/mailing list detection system, in accordance with an embodiment of the present invention.

FIG. 1 is a functional block diagram illustrating bot/mailing list detection system 100, in accordance with an embodiment of the present invention. In an example embodiment, bot/mailing list detection system 100 may include network 110, email server 120, and computing device 130.

In various embodiments, network 110 may be implemented as, for example, a local area network (LAN), a wide area network (WAN) such as the Internet, or a combination of the two. Network 110 may include, for example, wired, wireless or fiber optic connections. In general, network 110 may be any combination of connections and protocols that will support communications between computing device 130 and email server 120, in accordance with an embodiment of the present invention.

Email server 120 may include email transfer program 122. In various embodiments, email server 120 may be a desktop computer, a notebook, a laptop computer, a networked computer appliance, or any other networked electronic device or computing system capable of sending and receiving email messages to and from other computing devices such as computing device 130, via network 110. Furthermore, email server 120 may host a mail transfer agent program (e.g. email transfer program 122) to facilitate the transfer of email messages between computing devices. In an example embodiment, email server 120 utilizes a mail transfer agent program to send email messages to computing device 130. Email server 120 is described in more detail with reference to FIG. 3.

Email transfer program 122 represents a commercially available, open source, or proprietary mail transfer agent program. Email transfer program 122 may be a software application or configuration in a software application operating to transfer electronic mail messages from one computing device to another using a client-server application architecture. Email transfer program 122 may be located on email server 120. In an example embodiment, email transfer program 122 receives and sends, via network 110, email messages from and to client email program 132 located on computing device 130.

Computing device 130 may include client email program 132. Computing device 130 may be a desktop computer, a notebook, a laptop computer, a tablet computer, a handheld device, a smart-phone, a thin client, or any other electronic device or computing system capable of sending and receiving data to and from other computing devices such as email server 120, via network 110, and capable of supporting the functionality required of embodiments of the invention. Computing device 130 is described in more detail with reference to FIG. 3.

Client email program 132 may include bot/mailing list detection program 134. Client email program 132 represents a commercially available, open source, or proprietary email client program that includes the mail-bot and mailing list detection functionality represented by bot/mailing list detection program 134. In an example embodiment, Client email program 132 includes typical email functionality, such as the creation, sending, and receiving of email messages to and from email server 120 via network 110. In addition to the typical email functionality, client email program 132 also includes functionality for detection of mail-bots and mailing lists.

Bot/mailing list detection program 134 operates to detect mail-bots and mailing lists in accordance with embodiments of the bot/mailing list detection system of FIG. 1. Bot/mailing list detection program 134 may be a software application or configuration in a software application capable of analyzing a user's email metadata. In an example embodiment, bot/mailing list detection program 134 may detect any mail-bots and/or mailing lists, based on a user's received email messages from senders. Bot/mailing list detection program 134 may also identify email messages from, or as a result of, detected mail-bots and detected mailing lists. Furthermore, in an example embodiment, bot/mailing list detection program 134 may allow the user to take action regarding any detected mail-bots and/or mailing lists and any identified email messages. The operations and functions of bot/mailing list detection program 134 are described in further detail below with regard to FIG. 2.

Figure 2:
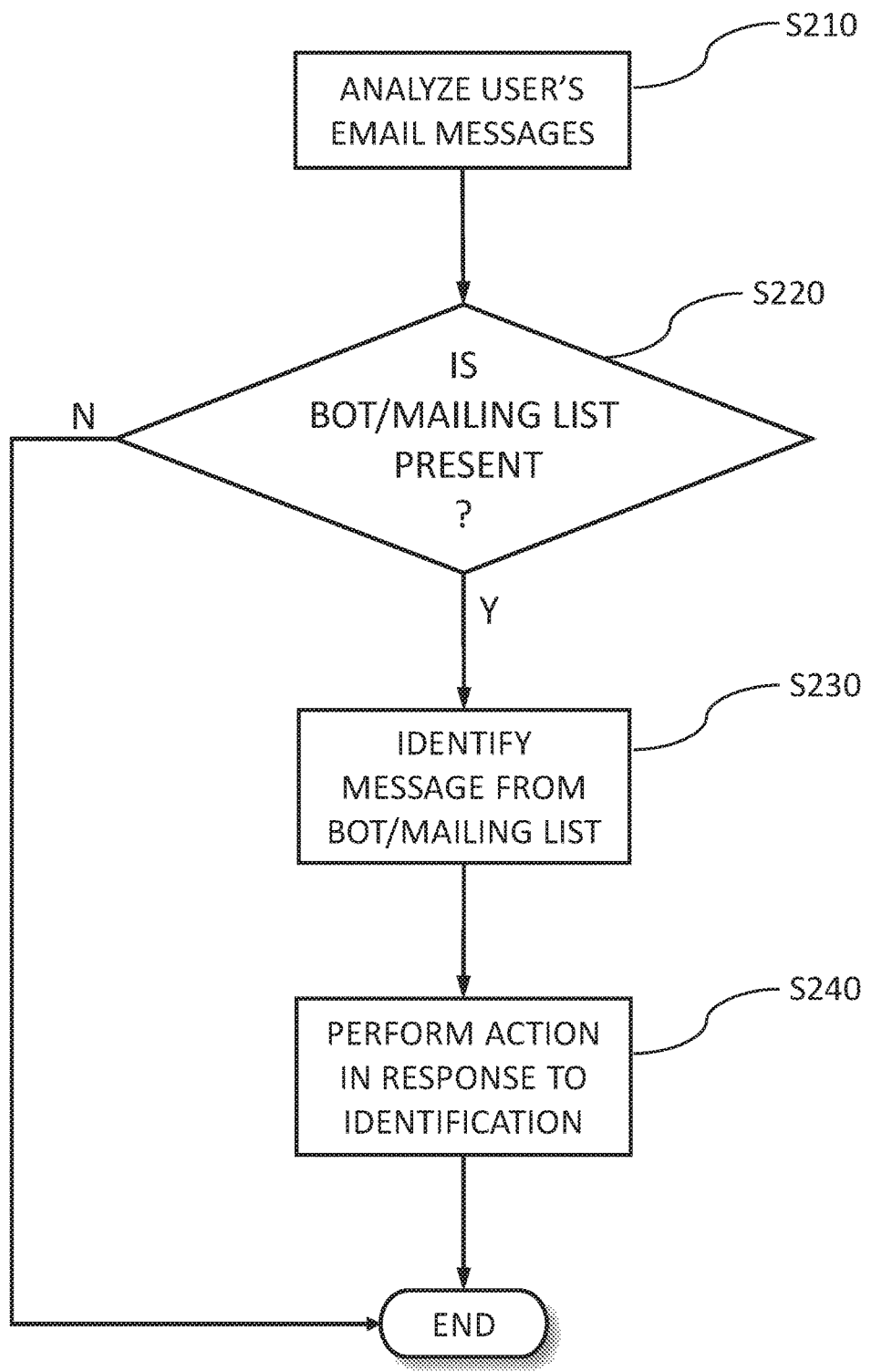
FIG. 2 is a flowchart illustrating the operations of the bot/mailing list detection program of FIG. 1, in accordance with an embodiment of the invention.

FIG. 2 shows a flowchart illustrating the operations of bot/mailing list detection program 134 in accordance with an example embodiment of the invention. Referring to step S210, bot/mailing list detection program 134 may analyze email metadata within a user's mail file to observe the usage patterns of email message senders. In particular, bot/mailing list detection program 134 may track one or more address fields (e.g. To, From, CC, BCC), the date field, and any other field in an email header to determine if a sender's email usage pattern is indicative of an automated mailing system, such as a mail-bot or mailing list. A sender's email usage pattern may encompass information pertaining to identification of one or more recipients of the sender's email messages, email message dates/times, and information concerning any email messages received by the sender. The analysis may query the user's email metadata or iterate over the user's email metadata. For example, bot/mailing list detection program 134 may have access to the user's email metadata encompassing all of the user's email messages, stored on computing device 130, from the past month. Bot/mailing list detection program 134 may then iterate over all the senders of email messages, that have sent more than a predetermined number of email messages, and see if they were a recipient on any email messages; if not, bot/mailing list detection program 134 may suspect the sender as a mail-bot. The analysis performed by bot/mailing list detection program 134 is confined to the email metadata belonging solely to the user and does not aggregate multiple users' email metadata. In an example embodiment, bot/mailing list detection program 134 accesses and analyzes the email metadata belonging to the current user of client email program 132 to look for indications of automation within patterns of email usage by email message senders which may expose a mail-bot or the use of a mailing list.

Referring to step S220, bot/mailing list detection program 134 interprets the analyzed email metadata belonging to the user to determine if a mail-bot or mailing list is present. Bot/mailing list detection program 134 defines a mail-bot based on a usage pattern where an email message sender sends more than a threshold number of email messages within a predetermined period of time (e.g. a few weeks to a few months), while not having received a threshold number of email messages. Furthermore, bot/mailing list detection program 134 determines that for each email message the user received that was not explicitly addressed to the user, any one or more other users in the addressee fields must either have sent one or more email messages to someone or be identified as a mailing list. While the user's email metadata contains information tracking any email messages sent or received between the user and the sender, the user's email metadata may also contain information passively tracking any email messages sent or received between other users and the sender. For example, in an email thread, where the user may be passively observing email messages between the sender and other users. In an example embodiment, bot/mailing list detection program 134 determines that a sender of email messages to the user of client email program 132 is a mail-bot based on the user's email metadata tracking email message address fields within the past month and showing the sender as having sent more than a threshold number of email messages within the past month, while not receiving a threshold number of email messages during the past month. Consequently, bot/mailing list detection program 134 may classify, within the user's mail file only, the sender as a mail-bot.

Referring to step S230, bot/mailing list detection program 134 may identify email messages originating from a mail-bot or resulting from a mailing list. Bot/mailing list detection program 134 may also identify and display, to the user, the sender who has been classified as a mail-bot, as well as any email messages from that sender. Furthermore, bot/mailing list detection program 134 may display, to the user, any other user identified as a mailing list, as well as any email messages resulting from the identified mailing list. Moreover, bot/mailing list detection program 134 may also display one or more predefined actions the user may take, in response to the displayed information, which may affect how email messages from the sender are managed and/or displayed. In an example embodiment, bot/mailing list detection program 134 identifies email messages sent from the sender classified as a mail-bot in step S220 and displays to the user the name of the sender, a listing of any emails received from that sender, and one or more possible actions the user may take concerning the email messages from the sender.

Referring to step S240, bot/mailing list detection program 134 may perform one or more actions in response to the identifications and information displayed in step S230. The actions may affect how identified email messages are managed and/or displayed. For example, bot/mailing list detection program 134 may move identified email messages to a folder other than the inbox (e.g. trash/delete, spam, or another designated folder). In another example, bot/mailing list detection program 134 may notify the user when email messages from the sender, or from other users identified as a mailing list, arrive. In yet another example, bot/mailing list detection program 134 may mark all identified email messages, as well as future email messages, from the sender, or from other users identified as a mailing list, as read. Additionally, in step S240, bot/mailing list detection program 134 may also automatically change how the name of the sender, and the user identified as a mailing list, is displayed within the user's email. For example, bot/mailing list detection program 134 may flag the name of the detected sender, and the user identified as a mailing list, in a manner (e.g. bolded text, colored text, use of graphic) which visually indicates, to the user, that they are a mail-bot and mailing list, respectively. As another example, bot/mailing list detection program 134 may filter out the detected sender, and the user identified as a mailing list, from the user's email based on detection/identification alone, or based on further analysis. As yet another example, bot/mailing list detection program 134 may group or categorize the sender, and the user identified as a mailing list, with similar senders and users, as appropriate. Changes in the way the name of a detected sender, and user identified as a mailing list, is displayed are implemented only in the user's email program (e.g. client email program 132). For example, although the current user's email (e.g. client email program 132) may show the detected sender as a mail-bot, another user's email may not. In an example embodiment, bot/mailing list detection program 134 moves all identified email messages from the sender to a spam folder. Furthermore, bot/mailing list detection program 134 has placed a graphic next to the sender's name, within client email program 132, indicating that the sender is a mail-bot.

Figure 3:
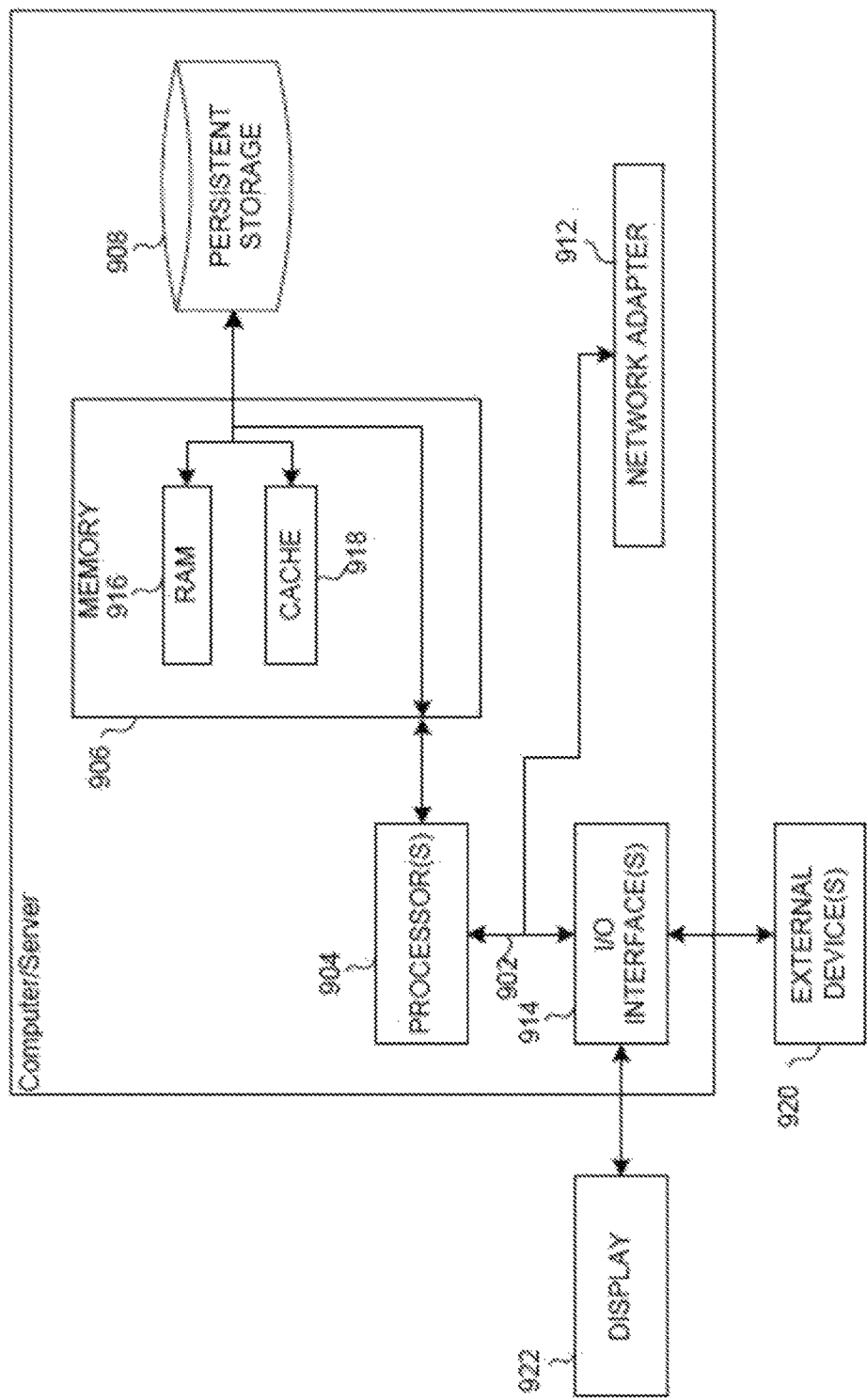
FIG. 3 is a block diagram depicting the hardware components of the physical condition detection system of FIG. 1, in accordance with an embodiment of the invention.

FIG. 3 depicts a block diagram of components of email server 120 and computing device 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Email server 120 and computing device 130 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs client email program 132 and bot/mailing list detection program 134 in computing device 130; and email transfer program 122 in email server 120 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs client email program 132 and bot/mailing list detection program 134 in computing device 130; and email transfer program 122 in email server 120 may be downloaded to persistent storage 908 through network adapter 912.

I/O interface(s) 914 allows for input and output of data with other devices that may be connected to email server 120 and computing device 130. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs client email program 132 and bot/mailing list detection program 134 in computing device 130; and email transfer program 122 in email server 120, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
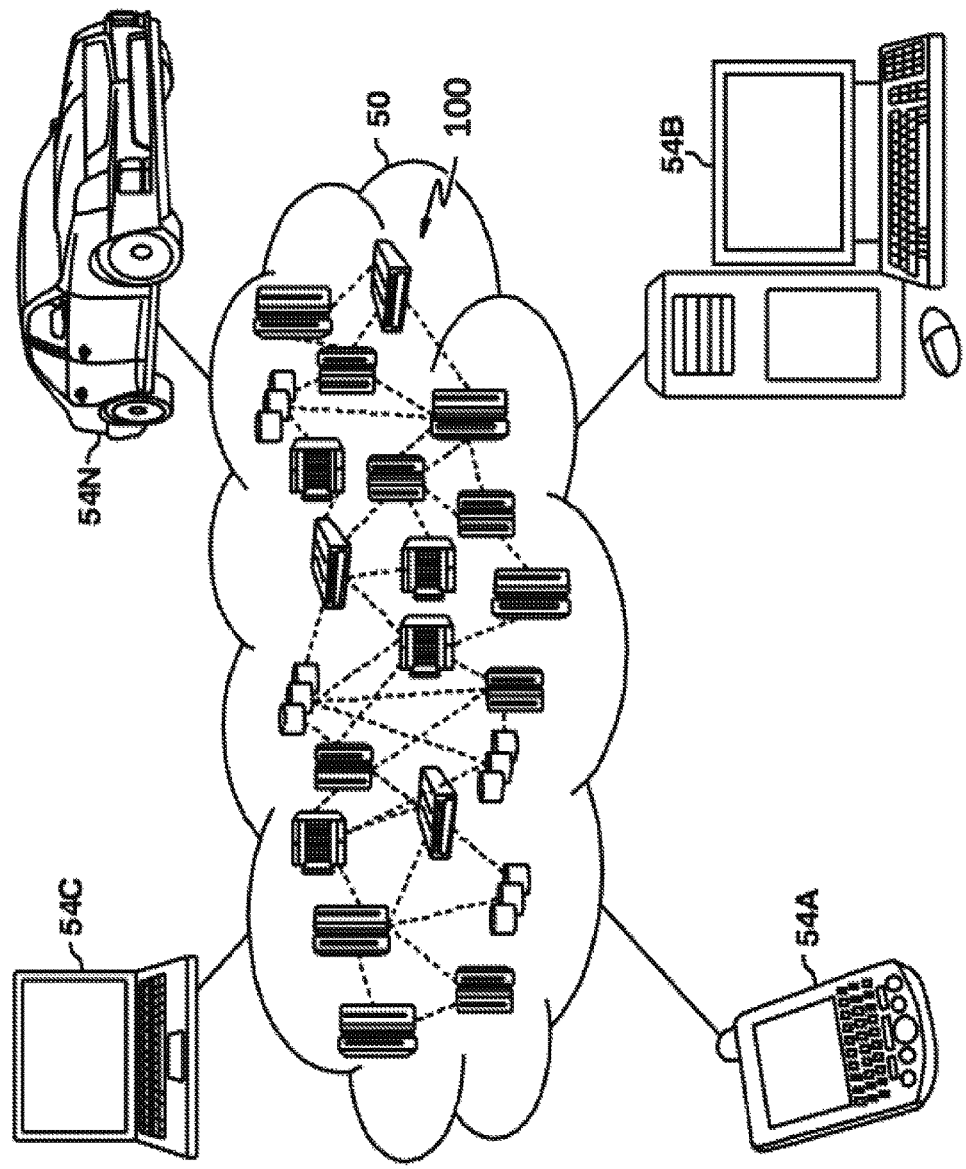
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
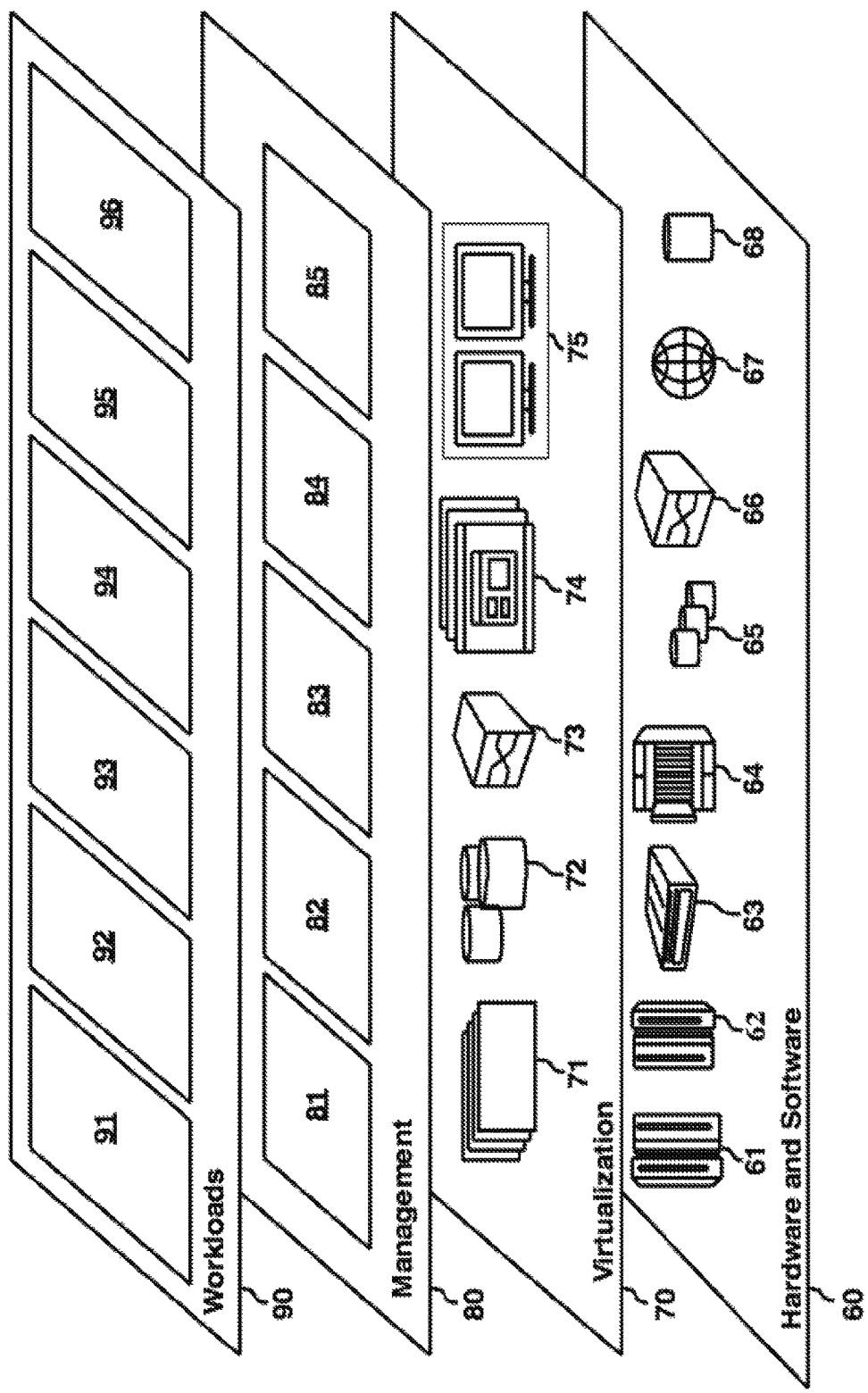
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and bot/mailing list detection system 96. Bot/mailing list detection system 96 may relate to detecting automated mailing systems within a user's mail file.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A computer program product for detecting email messages sent from an automated mailing system, the computer program product comprising:
   a computer-readable storage medium having program instructions embodied therewith, wherein the computer-readable storage medium is not a transitory signal per se, the program instructions comprising:
   program instructions to analyze email metadata of a user to detect an indication of automation comprising:
   program instructions to analyze the user's email metadata to detect a usage pattern of a sender of email messages, wherein the sender of email messages sends a threshold number of email messages to the user, within a period of time, without receiving a threshold number of email messages;
   program instructions to identify the sender of email messages as a mail-bot in response to the detected usage pattern;
   program instructions to analyze the user's email metadata to detect a received email message not explicitly addressed to the user, wherein the received email message not explicitly addressed to the user is received by one or more other users;
   program instructions to identify the one or more other users as a mailing list; and
   program instructions to add the identified one or more other users to a group of mailing lists;
   program instructions to identify email messages sent corresponding to the detected indication of automation;
   program instructions to perform an action in response to the identified email messages, wherein the action comprises moving one or more of the identified email messages to a specified email folder, marking as read one or more of the identified email messages, deleting one or more of the identified email messages, and filtering out one or more of the identified email messages;
   program instructions to determine whether the one or more other users in the group of mailing lists has sent email messages to the user;
   based on determining that the one or more other users in the group of mailing lists has sent email messages to the user, program instructions to remove the one or more other users from the group of mailing lists; and
   program instructions to provide a visual indication to the user for identified email messages, wherein the visual indication for identified email messages is different from a visual indication for unidentified email messages.

2. A method for controlling an email system comprising:
   detecting a sender sending within a predefined time period a threshold number of email messages to a user without receiving a threshold number of email messages to identify a plurality of email messages received by the user as being sent by an automated mailing system;
   generating a visual indication of the plurality of email messages different from a visual indication for email messages other than the plurality of email messages;
   identifying one of the plurality of email messages as (i) not being explicitly addressed to the user and (ii) being received by one or more other users;
   adding the one or more other users to a group of mailing lists;
   determining whether a subset of the one or more other users has sent email messages to the user; and
   removing the subset of the one or more other users from the group of mailing lists responsive to the subset of the one or more other uses having sent email messages to the user.

3. The method of claim 2 further comprising moving at least some of the plurality of email messages to a specified email folder, marking as read at least some of the plurality of email messages, deleting at least some of the plurality of email messages, or filtering out at least some of the plurality of email messages.

4. A method for controlling an email system comprising:
   identifying a plurality of email messages received by a user as being sent by an automated mailing system responsive to detecting a sender sending within a predefined time period a threshold number of email messages to the user without receiving a threshold number of email messages;
   moving at least some of the plurality of email messages to a specified email folder, marking as read at least some of the plurality of email messages, deleting at least some of the plurality of email messages, or filtering out at least some of the plurality of email messages;
   identifying one of the plurality of email messages as (i) not being explicitly addressed to the user and (ii) being received by one or more other users, adding the one or more other users to a group of mailing lists, determining whether a subset of the one or more other users has sent email messages to the user, and removing the subset of the one or more other users from the group of mailing lists responsive to the subset of the one or more other users having sent email messages to the user; and
generating a visual indication of the plurality of email messages different from a visual indication for email messages other than the plurality of email messages.

* * * * *